(12) United States Patent
Manley

(10) Patent No.: US 9,868,867 B1
(45) Date of Patent: Jan. 16, 2018

(54) SOLVENTS AND USES THEREOF

(71) Applicant: Russell Scott Manley, Gray Court, SC (US)

(72) Inventor: Russell Scott Manley, Gray Court, SC (US)

( * ) Notice: Subject to any disclaimer, the term of this patent is extended or adjusted under 35 U.S.C. 154(b) by 763 days.

(21) Appl. No.: 13/684,681

(22) Filed: Nov. 26, 2012

(51) Int. Cl.
*C11D 3/43* (2006.01)
*B08B 3/04* (2006.01)
*C09D 9/00* (2006.01)

(52) U.S. Cl.
CPC .................. *C09D 9/005* (2013.01)

(58) Field of Classification Search
CPC ... C11D 3/2068; C11D 3/2072; C11D 3/2093; C11D 3/3445; C11D 3/43; C11D 7/263; C11D 7/264; C11D 7/266; B08B 3/04
See application file for complete search history.

(56) References Cited

U.S. PATENT DOCUMENTS

| | | |
|---|---|---|
| 4,078,102 A | 3/1978 | Bendz |
| 5,288,335 A | 2/1994 | Stevens |
| 5,308,527 A | 5/1994 | Lallier |
| 5,545,353 A | 8/1996 | Honda |
| 5,597,788 A | 1/1997 | Stevens |
| 5,753,603 A | 5/1998 | Lallier |
| 5,980,626 A * | 11/1999 | Lallier ............... 106/162.8 |
| 6,001,192 A | 12/1999 | Lallier |
| 6,040,285 A | 3/2000 | Lallier |
| 6,174,847 B1 * | 1/2001 | Lallier ............... C09D 9/005 134/38 |
| 6,482,270 B1 | 11/2002 | Machac |
| 6,608,012 B2 | 8/2003 | Machac |
| 6,923,873 B2 | 8/2005 | Pageau |
| 7,087,565 B2 | 8/2006 | Shank |
| 7,767,637 B2 | 8/2010 | Simandl |
| 2002/0132491 A1 | 9/2002 | Lang |
| 2004/0186033 A1 | 9/2004 | Waldrop |
| 2004/0248753 A1 | 12/2004 | Karlsson |
| 2005/0245412 A1 | 11/2005 | Shah |
| 2008/0283097 A1 * | 11/2008 | Simandl ............... C08J 3/18 134/19 |

FOREIGN PATENT DOCUMENTS

| | | |
|---|---|---|
| EP | 057579 | 4/1993 |
| JP | 08260067 | 10/1996 |
| JP | 10168362 | 6/1998 |
| WO | WO0142376 | 6/2001 |
| WO | WO2005042136 | 5/2005 |

* cited by examiner

*Primary Examiner* — Brian P Mruk

(57) ABSTRACT

Generally, the present invention relates to industrial cleaning solvents for removing coatings and adhesives and methods for using these solvents. More specifically, the invention relates to solvents for industrial cleaning and for removing/dissolving urethane, varnish, and epoxy coatings and adhesives.

34 Claims, 7 Drawing Sheets

SOLVENTS AND USES THEREOF

CROSS REFERENCE TO RELATED APPLICATIONS

Not Applicable

BACKGROUND OF INVENTION

Generally, the present invention relates to industrial cleaning solvents for removing coatings and adhesives and methods for using these solvents. More specifically, the invention relates to solvents for industrial cleaning and for removing/dissolving urethane, varnish, and epoxy coatings and adhesives.

Urethane materials are commonly used as adhesives, coatings, foam fillers, foam structures, and foam cushions. From an application perspective there is no meaningful-distinction between the terms "urethane" and "polyurethane." These materials are sometimes formulated as single part compositions and sometimes formulated as multi-part compositions that are mixed prior to application. Sometimes the urethanes are heated ("hot melted") for applications, sometimes special curing agents such as moisture are used. Urethanes are often applied as coatings to components and are often fabricated as molded mechanical components.

Urethanes are capable of forming strong bonds with other materials such as wood, glass, masonry, and metal. As a consequence urethanes are often used as coatings and adhesives.

Varnish materials were traditionally comprised of a drying oil, a resin, and a solvent. Today, varnishes include a range of natural and synthetic resins including unpigmented and lightly pigmented acrylic, polyurethane, and epoxy. Varnishes can create hard, lustrous, semi-transparent coatings that enhance and protect substrates. Varnishes are often applied to wood products such as furniture, floors, and musical instruments so that the natural aesthetics of the wood are visible yet protected. Varnishes are also widely used in the electrical component industry for sealing and insulating parts such as electric motor windings where they are used as an adhesive sealer. Varnishes are capable of forming strong bonds with other materials such as wood, glass, masonry, and metal. As a consequence, varnishes are often used as coatings and adhesives.

Epoxy materials are commonly used as adhesives, coatings, and as matrix components in the manufacture of composite materials. These materials are copolymers formed from a resin and activator combination creating cross linked arrays of polymer chains. Epoxies are often applied as coatings to components. They are also often used as the bonding matrix in composite materials which are made from other materials with desirable properties such as strength or conductivity. Epoxies are capable of forming strong bonds with other materials such as wood, glass, masonry, and metal. As a consequence, epoxies are often used as coatings and adhesives.

Frequently it is desirable to detach a urethane, varnish, or epoxy from a component, or to separate two components that have been bonded together by a urethane, varnish, or epoxy adhesive. Often it is desirable to detach a coating system comprised of layers of these materials superimposed upon and bonded to each other from a substrate. For many years, dichloromethane (DCM) was the "gold standard" solvent for debonding. However, this solvent has been identified as a hazardous air pollutant, a poison, and a suspected carcinogen. Hence, its use has been eliminated by much of industry and it is highly regulated by government environmental, health, and safety agencies. Halogenated materials like DCM are also unsatisfactory for certain applications in that free halogens which are released by the halogenated hydrocarbons will attack metals such as copper, nickel, and iron. The presence of halogenated stripper residues, which are entrapped on the substrate, can cause latent attack and reliability problems. While a number of replacement solvents have been identified, very few approach the effectiveness of DCM. Also, many of the replacement solvents are flammable, corrosive, highly reactive, or have other characteristics that constitute hazardous wastes under the Resource Conservation and Recovery Act (RCRA) at 42 U.S.C. 6921-6939e. Other replacement materials have various shortcomings such as a pungent odor, the potential for diversion to illicit drug manufacturing, or ineffectiveness in attacking urethanes, varnishes, and epoxies; particularly in thin bond lines.

N-methyl-pyrrolidone (NMP) has been used as a replacement solvent in some applications. The relative strength of N-methyl-pyrrolidone compared to more conventional solvents like DCM is weak. NMP is regulated under the Comprehensive Environmental Response, Compensation, and Liability Act (CERCLA) section 313 and suspected to be a reproductive toxicant. Certain states like California have recognized NMP as a chemical of concern and as a result, some industries have moved away from using this as a solvent. Very few chemicals closely related to NMP (cyclic amides) are liquids at room temperature. Those that are, are less desirable solvents because they are higher in cost and display weaker solvency than NMP. Other solvents that have been used to replace conventional solvents (i.e., benzyl alcohol, dibasic ester, and propylene glycol n-butyl ether) are only modestly effective at removing paints and adhesives. What is needed, therefore, are more effective and practical solvents that can be used in debonding urethane, varnish, and epoxy coatings and adhesives from components.

Solvents designed to remove coatings and adhesives generally consist of up to four types of components: primary solvents, cosolvents, activators, and extenders. Primary solvents are those chosen for their ability to substantially attack the coatings of interest. Cosolvents are chosen to increase the versatility of the solvent with regard to the types of the materials it attacks. Activators are chosen for their catalytic effects; their ability to accelerate penetration of the coating and enable faster, more complete breakdown of the film's molecular bonds. Extenders are chosen to enhance some other desirable characteristic like flash point, drying time, or cost and may also contribute to the overall effectiveness of the solvent.

One such desirable characteristic is lower volatile organic compound (VOC) content. Solvents with lower VOC content have become more desirable as regulations governing VOC emissions have increased. VOC-exempt materials, such as dimethyl carbonate, tertiary butyl acetate, and water, are useful cosolvents and extenders to lower the VOC content of a solvent. The state of California is a leader in regulations that define VOC content limits with regulations that define VOC limits by product type and application. Like California, some states are excluding Low Vapor Pressure (LVP) solvents from the VOC content calculation: The California Air Resource Board (CARB) defines LVPs as solvents that boil above 216° C. or have vapor pressures below 0.1 mm Hg at 20° C.

CARB regulations contain rules that cover solvent VOC limits based on percent by weight, grams/liter, and partial vapor pressure. Increasingly restrictive regulations are creating urgent needs for effective solvents that are safer to use and have lower VOC content. For this reason it is desired to utilize VOC-exempt or LVP cosolvents and extenders when practical.

In addition to these four possible main components of a solvent for removing paint and adhesive, other materials may be used as additives to enhance the solvent's physical characteristics such as thickening agents to increase viscosity, emulsifiers to improve solubility of the solvent's various components, and materials that form floating, evaporative caps, a device particularly useful for reducing evaporation when the solvent is to be used in a heated tank application.

REFERENCES CITED: US PATENT NOS.

U.S. Pat. No. 4,078,102 (Process for stripping resist layers from substrates) Bendz March 1978—addresses prior art in the field while teaching a process for removing an organic polymer resist layer from a substrate comprising treating the layer with a mixture consisting essentially of an alcoholic solution of an activator compound selected from the group consisting of ammonium, alkali metal, and alkaline earth metal hydroxides and carbonates and an aldehyde or ketone in proportions to provide between about 0.005 mole to 0.1 mole of activator compound per mole of aldehyde or ketone so as to remove said resist layer from said substrate.

U.S. Pat. No. 5,288,335 (Paint stripper and varnish remover compositions, methods for making these compositions and methods for removing paint and other polymeric coatings from flexible and inflexible surfaces) Stevens February 1994—addresses prior art in the field, specifically corrosivity issues with halogenated materials used in stripping solvents, while teaching a process to remove an organic polymer resist layer from a substrate using an alcoholic solution containing an activator consisting of ammonium, alkali metal, or alkaline earth metal hydroxide or carbonate in conjunction with an aldehyde or keytone.

U.S. Pat. No. 5,308,527 (Aprotic polar solvent/ether paint stripping compositions) Lallier May 1994—addresses prior art in the field and speaks to the usefulness and disadvantages of aprotic polar solvents particularly lactones, N-methyl-pyrrolidone (NMP), and dimethyl sulfoxide (DMSO) while teaching a process for the removal of paint from a substrate coated therewith comprising contacting an effective stripping amount of a composition, which comprises a) from 1% to 20% by volume of dimethyl sulfoxide and b) from 99% to 80% by volume of an ether selected from among methyl-tert-butylether, tert-amylmethylether, tetrahydrofuran, dioxane, and mixtures thereof, with said paint coated substrate; allowing said paint to swell, form blisters and become detached; and removing at least a portion of said paint from said substrate.

U.S. Pat. No. 5,545,353 (Non-corrosive photoresist stripper composition) Honda August 1996—addresses prior art in the field and corrosion issues with stripping solvents containing amine groups while teaching a photoresist stripper composition comprising: a) from about 20 to about 70% by weight of an organic polar solvent having a dipole moment of more than 3.5; b) from about 70 to about 20% by weight of an amine compound selected from the group consisting of an alkanolamine compound; and c) from about 0.1 to about 10% by weight of (2-benzothiozolylthio) succinic acid; all percents based on the weight of the stripper composition.

U.S. Pat. No. 5,597,788 (Paint stripping compositions and methods) Stevens January 1997—addresses prior art in the field while teaching a composition for use in removing polymeric coatings from flexible and inflexible surfaces consisting essentially of: a) about 10% to about 40% by weight of a conjugated terpene selected from the group consisting of a alphatic terpene selected from the group consisting of alpha-terpinene, tagetone, terpinolene, isoterpinolene, allo-ocimene, myrcene, ocimenone, and mixtures thereof; b) about 5% to about 60% by weight of benzyl alcohol; b) 0% to about 70% by weight of a terpene compound other than a conjugated terpene selected from the group consisting of alpha-terpinene, tagetone, terpinolene, isoterpinolene, allo-ocimene, myrcene, ocimenone, and mixtures thereof; d) 0% to about 20% by weight of a surfactant; and e) about 0.05% to about 60% by weight of a rheological additive; f) about 2% to about 70% by weight a solvent selected from the group consisting of N-methyl pyrrolidone, ethylene carbonate, propylene carbonate, butylene carbonate, and mixtures thereof; and g) an amine selected from the group consisting of aminomethylpropanol, methylamine, dimethylamine, trimethylamine, ethylamine, diethylamine, triethylamine, propylamine, dipropylamine, tripropylamine, ethanolamine, triethethanolamine, and mixtures, thereof.

U.S. Pat. No. 5,753,603 (Paint stripping composition) Lallier May 1998—teaches a paint stripping composition comprising, by volume: a) 1 to 20% of an aprotic polar solvent selected from the group consisting of: dimethyl sulfoxide (DMSO), dimethyl formamide (DMF), N-methyl pyrrolidone (NMP), N-methyl-morpholine (NMm), y-butyrolactone (BLo), acetonitrile (AcN), and mixtures thereof; and b) 99 to 80% of an ether, said ether having: a flash point higher than 0° C., a molar volume less than 160, a molecule having one or several methoxy groups, and a molecule devoid of hydroxyl groups, in which the ether is anisole, 1,2-dimethyoxybenzene, 1,3-dimethoxybenzene, 1,4-dimethoxybenzene, 1-2-3-trimethoxybenzene, 2-methooxy-1,3-dioxolane, 2-methoxy-3,4-dihydropyrane, 2,5-dimethoxytetrahydrofurane, ethylene glycol dimethyl ether, diethylene glycol dimethyl ether, or 1-tert-butoxy-2-methoxy ethane.

U.S. Pat. No. 5,980,626 (Aqueous compositions for stripping paints and primers with a high degree of crosslinking) Lallier November 1999—addresses prior art in the field while teaching a composition for stripping paints and primers from a substrate obtained by mixing the following constituents: a) 50 to 80 parts by weight water; b) 20 to 50 parts by weight of benzaldehyde or mixture of benzaldehyde with benzyl alcohol; c) 5 to 15 parts by weight of at least one activator selected from the group consisting of formic acid, formic acid totally or partially neutralized with base, and bases; and d) 0.5 to 10 parts by weight of at least one thickener.

U.S. Pat. No. 6,001,192 (Paint stripping composition) Lallier December 1999—addresses prior art in the field while teaching a process for removing a paint surface layer from a substrate coated therewith, comprising contacting the surface layer with an effective stripping amount of a paint stripping composition comprising, by volume: a) 1 to 99% of an aprotic polar solvent selected from the group consisting of: dimethyl sulfoxide (DMSO), dimethyl formamide (DMF), N-methyl pyrrolidone (NMP), N-methyl-morpholine (NMm), y-butyrolactone (BLo), acetonitrile (AcN), and mixtures thereof; and b) 99 to 1% of an ether, said ether having: a flash point higher than 0° C., a molar volume less than 160, a molecule having one or several methoxy groups, and a molecule devoid of hydroxyl groups, in which the ether is anisole, 1,2-dimethyoxybenzene, 1,3-dimethoxybenzene, 1,4-dimethoxybenzene, 1-2-3-trimethoxybenzene, 2-methooxy-1,3-dioxolane, 2-methoxy-3,4-dihydropyrane, 2,5-dimethoxytetrahydrofurane, ethylene glycol dimethyl ether, diethylene glycol dimethyl ether, or 1-tert-butoxy-2-methoxy ethane.

U.S. Pat. No. 6,040,285 (Composition for stripping paints, varnishes or lacquers) Lallier March 2000—addresses prior art in the field while teaching a composition for stripping paints, varnishes, or lacquers from a substrate, comprising: a) a mixture of at least one aromatic solvent selected from the group consisting of benzaldehyde and anisole, and of benzoic acid; and b) 99 to 30 parts by weight of water.

U.S. Pat. No. 6,174,847 (Composition for stripping paints varnishes or lacquers) Lallier January 2001—addresses prior art in the field while teaching a composition for stripping paints, lacquers, or primers, comprising: a) 5 to 90 parts by weight of water; b) 2 to 47.5 parts by weight of benzyl alcohol; and c) 2 to 47.5 parts by weight of dimethyl sulfoxide.

U.S. Pat. No. 6,482,270 (Paint and coating remover) Machac November 2002—addresses prior art in the field while teaching a process for removing paint, comprising: applying a composition to a painted surface for a time and under conditions effective to cause blistering or bubbling of the paint, wherein the composition comprises a carbonate, a dibasic ester and a mono-ester, an organic sulfur containing compound, a thickener, and optionally a ketone, optionally a glycol ether, optionally an alcohol, and optionally an activator.

U.S. Pat. No. 6,608,012 (Process and formulations to remove paint and primer coatings from thermoplastic polyolefin substrates) Machac August 2003—addresses prior art in the field while teaching a composition for removing coatings comprising: a carbonate, a pyrrolidone, a monoester, a ketone, a glycol ether, an organic sulfur-containing compound, and optionally an alcohol and optionally a thickener wherein the composition contains from about 10% to about 50% by weight of the carbonate, from about 15% to about 45% by weight of the pyrrolidone, from about 15% to about 45% by weight of the monoester, from about 5% to about 20% by weight of the ketone, from about 5% to about 20% of the glycol ether and from about 10% to about 30% by weight of the sulfur containing compound.

U.S. Pat. No. 6,923,873 (Paint stripping composition and method of using the same) Pageau August 2005—addresses prior art in the field while teaching a paint stripping composition consisting essentially of: 1-20% aromatic or aliphatic hydrocarbons, 30-50% dimethyl formamide, 15-25% N-methyl-pyrrolidone, 5-20% benzyl alcohol, 1-10% alkanolamine, 1-15% wax, 0.5-4% wetting agent, and 0.5-5% thickening agent all percentages being by weight.

U.S. Pat. No. 7,087,565 (Methylene chloride-free and optionally methanol-free paint stripper and/or gasket remover compositions) Shank August 2006—addresses prior art in the field while teaching methylene chloride free, single phase, paint stripping and gasket removing composition, comprising: a) a halogenated hydrocarbon liquid, having more than one carbon atom; b) a polar oxygenated organic liquid; and c) a hydrogen bondable thickener, wherein the polar oxygenated organic liquid and hydrogen bondable thickener are present in sufficient amounts to render the composition in a single phase and to synergistically increase the viscosity of the composition beyond the viscosity of a composition, without either of the polar oxygenated organic liquid or the hydrogen bondable thickener in substantially similar amounts.

U.S. Pat. No. 7,767,637 (Solvent for urethane adhesives and coatings and method of use) Simandl August 2010—this patent which is exclusively licensed by the applicant addresses prior art in the field while teaching a miscible solvent comprising from about 20 to about 80 weight % carbaldehyde and from about 20 to about 80 weight % cyclic amide and method for use.

REFERENCES CITED: US PUBLICATION NOS.

2002/0132491 (Method of removing photoresist material with dimethyl sulfoxide) Lang September 2002—addresses prior art in the field while teaching a method of removing photoresist material from a semiconductor substrate, comprising: providing a semiconductor substrate having a layer comprised of a low dielectric constant material disposed thereover and a layer comprised of photoresist material disposed over said layer comprised of said low dielectric constant material; and removing said layer comprised of photoresist material with dimethyl sulfoxide.

2004/0186033 (Method of removing coatings from plastic articles) Waldrop September 2004—addresses prior art in the field while teaching a method for removing paint from plastic parts which comprises treating the painted part with a solvent mixture of a high-boiling aprotic polar organic solvent and a pH adjuster.

2004/0248753 (Means for removing of paint from object) Karlsson December 2004—addresses prior art in the field while teaching a substance for removing paint, varnish, rubber, adhesive, plastic, and similar materials, comprising: N-methyl-2-pyrrolidone and a solvent selected from the group consisting of dibasic ester, carbonate, and dimethyl sulfoxide, and a product of a reaction between an aliphatic amine and an alkaline salt of unsaturated fatty acids and water and aliphatic alcohols.

2005/0245412 (Composition for removing a film from a substrate, a method of removing a film from a substrate, and a method of making the composition) Shah November 2005—addresses prior art in the field while teaching a composition for removing a film from a substrate, comprising: a mixture comprising: a water soluble biodegradable alkyl ester and a water insoluble biodegradable alkyl ester.

REFERENCES CITED: FOREIGN

EP Publication No. 0537579 (Method for decomposing polymer having urethane and/or urea bonds) Ikuta April 1993—addresses prior art in the field while teaching a method for decomposing a polymer having urethane and/or urea bonds, comprising mixing and heating the polymer together with a ketone and/or aldehyde to obtain a liquid having low viscosity.

JP Publication No. 08260067 (Method for recovering aluminum from laminated foil) Lallier October 1996—addresses prior art in the field while teaching a recovery method of aluminum in which laminating foil which adheres thermoplastics and aluminum foil by adhesives or an anchor coat agent is processed with volatile oxygenated aromatic compounds, a recovery method of aluminum from laminating foil characterized by separating thermoplastics and aluminum foil after dissolving these adhesives or making the adhesive strength be deteriorated.

JP Publication No. 10168362 (Composition for peeling paint, varnish or lacquer) June 1998—addresses prior art in the field while teaching a paint peeling material comprising benzaldehyde, benzoic acid, water, and an aromatic solvent selected from the group containing toluene, xylene, and anisole.

PCT Application No. WO0142376 (Thickened paint and coating remover) Marquis June 2001—addresses prior art in the field while teaching a composition useful as a paint remover, comprising: alkylene carbonate, hydrogen peroxide, and water.

PCT Publication No. WO2005042136 (A method for recycling polyurethane and a composition comprising recycled polyurethane) Villwolk May 2005—addresses prior art in the field while teaching a method of recycling polyurethane-containing material using a solvent and non-solvent wherein the solvent is selected from the group containing dimethyl sulfoxide (DMSO), N-methyl-2-pyrrolidone (NMP), N,N-dimethylformamide (DMF), acetonitrile, tetrahydrofuran (THF), hexamethylphosphoric acid triamide (HMPT) and mixtures thereof and the non-solvent includes but is not limited to polyol, water, acetone, or methylene chloride.

SUMMARY OF INVENTION

Generally, the present invention relates to industrial cleaning solvents for removing coatings and adhesives and methods for using these solvents. More specifically, the invention described herein relates to solvents for industrial cleaning and for dissolving urethane, varnish, and epoxy coatings and adhesives.

In some embodiments the invention relates to a solvent for removing urethane, varnish, and epoxy adhesives and coatings, the solvent having an aldehyde and cosolvent selected from the group consisting of ethanol, a carbonate ester, and dimethyl sulfoxide. In some embodiments, the solvent is further comprised of an activator, including but not limited to sulfuric acid, ethyl phenyl ether, methyl phenyl ether, estragole, eugenol, and triethanolamine.

In some embodiments, the solvent further comprises an extender, including but not limited to, isopropanol, tetrahydrofurfuryl alcohol, benzyl alcohol, a lactone, a petroleum distillate, dibasic ester, an ether acetate, an acetate ester, water, alkylated cyclosiloxanes, and/or a glycol alkyl ether.

In various specific embodiments, the solvent comprises a solvent, cosolvent, activator, extender, emulsifier, and/or a thickening agent as constituents in either hydrous or anhydrous blends. In some embodiments the solvent consists of miscible constituents.

In some specific embodiments, the aldehyde in the solvent is a carbaldehyde. In some specific embodiments the carbaldehyde in the solvent is benzaldehyde. In some specific embodiments the solvent comprises a cosolvent. Non-limiting examples of Cosolvents include dimethyl carbonate, dipropylene glycol methyl ether acetate (DPMA), dimethyl sulfoxide (DMSO), benzyl alcohol, and ethanol.

In various embodiments the solvent comprises an activator. In a specific embodiment the activator is phenetole.

In some embodiments, the solvent comprises an extender. In various embodiments, the extender comprises one or more of tertiary butyl acetate (TBAc), a petroleum distillate, dibasic ester, an ether acetate, an acetate ester, an alkylated cyclosiloxane, a glycol alkyl ether, or water. In some embodiments, the components in the solvent are miscible.

In some embodiments, one or more emulsifying agents may be added in blends of components that are not miscible. Non-limiting examples of emulsifying agents include alcohols, glycol ethers, and surfactants.

In some embodiments, one or more thickening agents may be added to increase the viscosity of the solvent. Non-limiting examples of thickening agents include a cellulosic, silica, wax, polymer, or acrylate.

In some embodiments an aldehyde and cosolvent blend are used at ambient temperature to separate a urethane, varnish, or epoxy bonded to a component. In some embodiments an aldehyde and cosolvent blend are heated above ambient temperature and used to separate a urethane, varnish, or epoxy material bonded to a component.

Exemplary Definitions

As used herein, acetate is a derivative of acetic acid and includes salts and esters.

As used herein acetate ester is a derivative of acetic acid consisting of a carbonyl adjacent to an ether linkage.

As used herein, the term acid is a material that meets any of three widely accepted definitions: (1) The Arrhenius definition states that acids are substances which increase the concentration of hydronium ions ($H_3O^+$) in solution. (2) The Brønsted-Lowry definition is an acid is a substance which can act as a proton donor. (3) The Lewis definition of acidity is an acid is a substance which can act as an electron-pair acceptor.

As used herein, an activator is a chemical additive that is chosen for its catalytic effects of a solvent; its ability to start a reaction or accelerate penetration of the coating and enable faster, more complete breakdown of a material's molecular bonds.

As used herein, an alcohol is an organic compound in which the hydroxyl functional group (—OH) is bound to a carbon atom.

As used herein, an aldehyde is an organic compound containing one or more formyl groups. Non-limiting examples of aldehydes include cumminaldehyde, 4-tert butylbenzaldehyde, benzaldehyde, anise aldehyde, aldehyde C-14, aldehyde C-16, succinaldehyde, furfuryl, tolualdehyde, acetaldehyde, propanal, and cinnamaldehyde.

As used herein, an alkyl group is a piece of a molecule with the general formula $C_nH_{2n+1}$, where n is some integer.

As used herein, an alkylated cyclosiloxane is any compound having a ring of alternating silicon and oxygen atoms, especially —SiH2-On- or its derivatives and one or more alkyl groups.

As used herein, an ambient temperature is the temperature of the surrounding environment.

As used herein, an amine includes derivatives of ammonia, wherein one or more hydrogen atoms have been replaced by a substituent such as an alkyl or aryl group.

As used herein, an aryl group is any functional group or substituent derived from an aromatic ring.

As used herein, a caprolactone means a cyclic ester.

As used herein, CARB refers to the California Air Resource Board.

As used herein, a carbaldehyde is an aldehyde that is attached to another entity—often a ring system. Non-limiting examples of carbaldehydes are furfural, benzaldehyde, and phellandral.

As used herein, a carbonate ester is an ester of carbonic acid.

As used herein, a carbonyl is a functional group composed of a carbon atom double-bonded to an oxygen atom.

As used herein, CERCLA refers to the Comprehensive Environmental Response, Compensation, and Liability Act.

As used herein, a cosolvent is a chemical additive that is chosen to increase the versatility of a solvent blend with regard to the types of the materials it attacks. Non-limiting examples of cosolvents include dimethyl carbonate, dipropylene glycol methyl ether acetate (DPMA), dimethyl sulfoxide (DMSO), benzyl alcohol, and ethanol.

As used herein, a dibasic ester is an ester of a dicarboxylic acid.

As used herein, an emulsifier is an agent that forms or preserves an emulsion and an emulsion is a mixture of two or more liquids that are normally immiscible Non-limiting examples of emulsifiers include isopropanol, dipropylene glycol N-butyl ether, propylene glycol N-butyl ether, Triton X100 (Dow Chemical), EcoSurf EH6 (Dow Chemical), and Surfonic N40 (Superior Oil).

As used herein, EPA refers to the Environmental Protection Agency.

As used herein, an ether is a class of organic compounds that contain an ether group, an oxygen atom connected to two alkyl or aryl groups, of general formula R—O—R'. An ether acetate is a derivative of acetic acid that contains an ether group and an ester is a chemical compound having a carbonyl adjacent to an ether linkage.

As used herein, an evaporative cap is an additive of less volatile material of lighter density than a solvent that floats on top of the solvent forming a barrier between the solvent and the atmosphere; thus, reducing the rate of evaporation.

As used herein, an extender is a chemical additive that is chosen to enhance a desirable characteristic of a solvent blend such as flash point, drying time, or cost and may also contribute to the overall effectiveness of the solvent.

As used herein, a formyl group is a functional group comprising a carbon bonded to an oxygen and bonded to a hydrogen.

As used herein, a glycol alkyl ether is a group of chemicals based on alkyl ethers of ethylene glycol.

As used herein, HAP refers to Hazardous Air Pollutant.

As used herein, a lactone is a cyclic ester.

As used herein, LVP solvents are solvents with boiling points above 216° C. at 760 mm Hg or with vapor pressures below 0.1 mm Hg at 20° C. as defined by CARB. Other regulatory bodies may have different definitions of LVP solvents which are intended to be incorporated herein.

As used herein, an organosulfur compound is an organic compound that contains sulfur.

Non-limiting examples of organosulfur compounds are sulfolane, dimethyl sulfone, and dimethyl sulfoxide.

As used herein, petroleum distillate is a generic term describing mixtures of hydrocarbons derived by distilling crude oil. Non-limiting examples of petroleum distillates are kerosene, mineral spirits, diesel fuel, gasoline, and naphtha.

As used herein, phenyl ethers are ethers that are linked to a benzene ring structure.

As used herein, phenyl propene (or allylbenzenes) are a class of phenylpropanoids, a type of polyphenols. A phenylpropanoid is a diverse family of organic compounds that are synthesized by plants from the amino acid phenylalanine.

As used herein, polarity is the separation of electric charge leading to a molecule or its chemical groups having an electric dipole or multipole moment.

As used herein, a polar protic solvent is a solvent that has a hydrogen atom bound to an oxygen (as in a hydroxyl group) or a nitrogen (as in an amine group) and high polarity. Non-limiting examples of polar protic solvents include alcohols, water, formic acid, and ammonia.

As used herein, a primary solvent is a chemical chosen for their ability to substantially attack materials of interest.

As used herein, RCRA refers to the Resource Conservation and Recovery Act.

As used herein, a sulfur compound is a compound that contains at least one sulfur atom.

As used herein, a thickening agent is a chemical additive that is used to increase the viscosity of a liquid or liquid blend. Non-limiting examples of thickening agents include paraffin wax, fumed silica, aluminum stearate, Carbopol (Lubrizol), and Klucel (Ashland).

As used herein, viscosity is the measure of the resistance of a fluid which is being deformed by either shear stress or tensile stress.

It is desirable to find solvents and chemical additives that when used together in a blend provide a synergy that enhance a solvent's characteristics and optimize its effectiveness on targeted coating and adhesive materials, particularly in coating systems which may include several types of coating chemistry applied in multiple layers. For example, modern highly cross-linked and catalyzed urethane coatings often overlay epoxy color coats and primers. The challenge of finding a synergistic combination that comprises a safe and effective paint and adhesive remover is exacerbated by the sheer number of possibilities given the thousands of known organic solvents, the almost 10 million known organic chemicals, and the over 1 million known inorganic chemicals. Using effective primary solvents in conjunction with synergistic cosolvents, extenders, and activators can enable safer, more environmentally friendly removal of such coating systems. Other components can include emulsifiers, thickening agents, and evaporative caps.

The solvent described herein, provides synergies far beyond those of its component materials alone. These synergies result in higher solvency which creates performance that approaches that of conventional solvents like dichloromethane (DCM); and yet, the solvent is not a hazardous air pollutant (HAP), not a Resource Conservation and Recovery Act (RCRA) hazardous material, not toxic, not flammable, contains no CERCLA section 313 controlled materials, contains no known carcinogens, contains no California Proposition 65 materials and, in some embodiments and adaptations, has a VOC content that meets CARB standards for paint and adhesive removers. These desirable characteristics combined with the solvent's surprising solvency and rate of reaction provide a long-sought solution to the long-felt but unsolved need to optimize the effectiveness, health, safety, and environmental compliance of cleaning and stripping solvents. These and other advantages of one or more aspects will become apparent from a consideration of the ensuing description and accompanying drawings.

The embodiments described in this summary are only examples of all possible embodiments and adaptations which are included within the scope of this description. In one embodiment an aldehyde is blended with an alcohol, an organosulfur compound, and an activator to create synergies that yield unexpected results in removing catalyzed, cross-linked polyurethane and epoxy automotive coating systems. This solvent was thickened using a cellulosic thickener to increase its viscosity such that it would stay in place when applied to non-horizontal surfaces. In this embodiment the aldehyde was benzaldehyde (a carbaldehyde), the alcohol was ethanol, the organosulfur compound was dimethyl sulfoxide, and the activator was a phenyl ether; however, other aldehydes, cosolvents, extenders, and activators were tested or considered as representatives of their categories which are included within the scope of this description.

The resulting solvent is not a hazardous air pollutant (HAP), not an RCRA hazardous material, not toxic, not flammable, contains no CERCLA section 313 controlled materials, contains no known carcinogens, and contains no California Proposition 65 materials. In other embodiments where VOC-exempt or LVP cosolvents and extenders such as dimethyl carbonate, propylene carbonate, and benzyl alcohol are used, the solvent also meets CARB standards for VOC content for paint and adhesive removers. Increasingly restrictive regulations are creating urgent needs for safer, more environmentally friendly solvents. These desirable characteristics combined with the solvent's surprising solvency and rate of reaction provide a long-sought solution to the long-felt but unsolved need to optimize the effectiveness, health, safety, and environmental compliance of cleaning and stripping solvents.

Also described herein are methods of using such a solvent to remove coatings and adhesives. These methods entail contacting the surface of the coating or adhesive with the solvent for a period of time sufficient for the coating or adhesive to soften or wrinkle and then, if necessary, using a mechanical means to remove the softened coating or adhesive.

Rates of reactions are in large part determined by the number of molecular collisions with energy higher than the reaction's energy of activation. The most significant variable in determining the number of molecular collisions in a given reaction that exceed the energy of activation and; therefore, in determining the rate of reaction, is temperature. The relationship between the rate of reaction and temperature is directly exponential. Heating a coating or adhesive material expands the film and opens the structure so that it is more easily attacked by a solvent. For these reasons heating the solvent, the material being stripped, or both above ambient temperature and contacting the surface of a coating or adhesive greatly accelerates the decomposition reaction. It is therefore preferential that during the stripping process the solvent and the component being stripped of coating or adhesive be heated for some period of time above ambient temperature.

Other objectives and advantages of the present invention will become obvious to the reader and it is intended that these objectives and advantages are within the scope of the present invention. To the accomplishment of the above and related objectives, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The details of the present invention, both as to structure and operation, may be gleaned in part by study of the accompanying drawings, in which like reference numerals refer to like parts, and in which.

DETAILED DESCRIPTION OF THE INVENTION

In one embodiment, the present invention provides a solvent that comprises from about 10 to about 90 wt % aldehyde or a structural analog thereof and from about 10 to about 90 wt % cosolvent wherein the cosolvent comprises one or more chemicals selected from the group consisting of a polar protic solvent, an ester, an acetate, and a sulfur compound or structural analogs thereof.

In some specific embodiments, the solvent further comprises from about 1 to about 30 wt % of an activator wherein the activator comprises one or more chemicals selected from the group consisting of an acid, a phenyl ether, a phenyl propene, and an amine or structural analogs thereof.

In other specific embodiments, the solvent further comprises from about 10 to about 80 wt % of one or more extenders selected from the group consisting of a petroleum distillate, dibasic ester, an ether acetate, an acetate ester, an alcohol, a lactone, water, an alkylated cyclosiloxane, and a glycol alkyl ether or structural analogs thereof.

In yet other embodiments, the solvent further comprises an additive means of emulsifying immiscible components.

In still other embodiments, the solvent further comprises an additive means for increasing viscosity.

In other embodiments, the solvent further comprises an additive means to reduce or slow evaporation.

Figure 1:
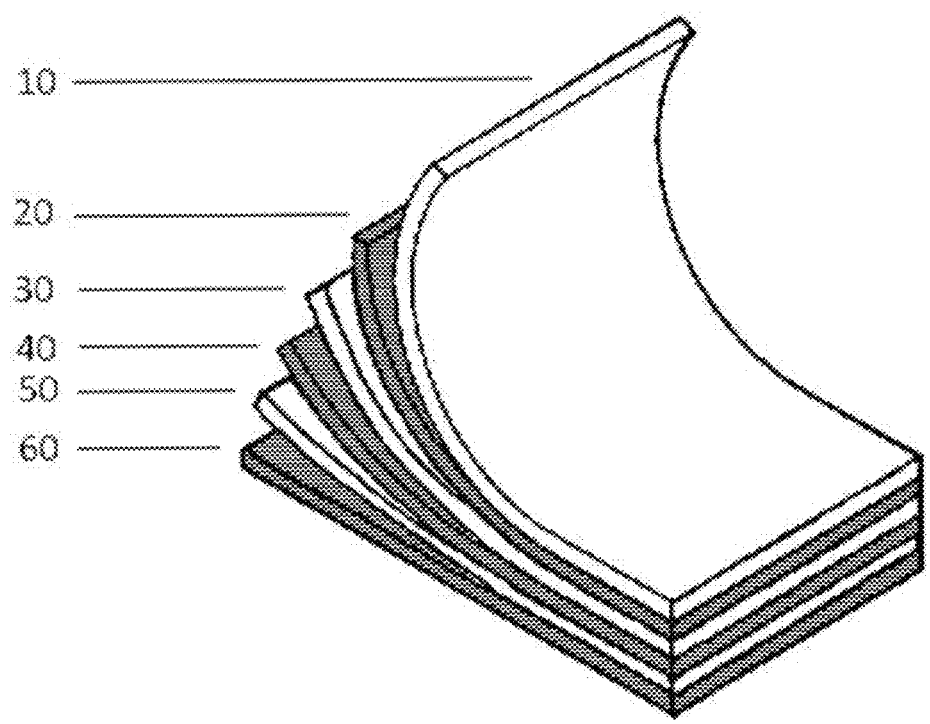
FIG. 1 is a perspective illustration showing the compositional layers of a typical automotive paint system with a total thickness of from about 3.5 mm to about 6.0 mm. In this figure, (10) is a clear coat; (20) is an optional pearl coat; (30) is a color coat; (40) is a single or multiple coats of a primer; (50) is an E-coat; and (60) is the surface of the component. Non limiting examples of component surfaces include metal, plastic, fiberglass, or composite.
Figure 2:
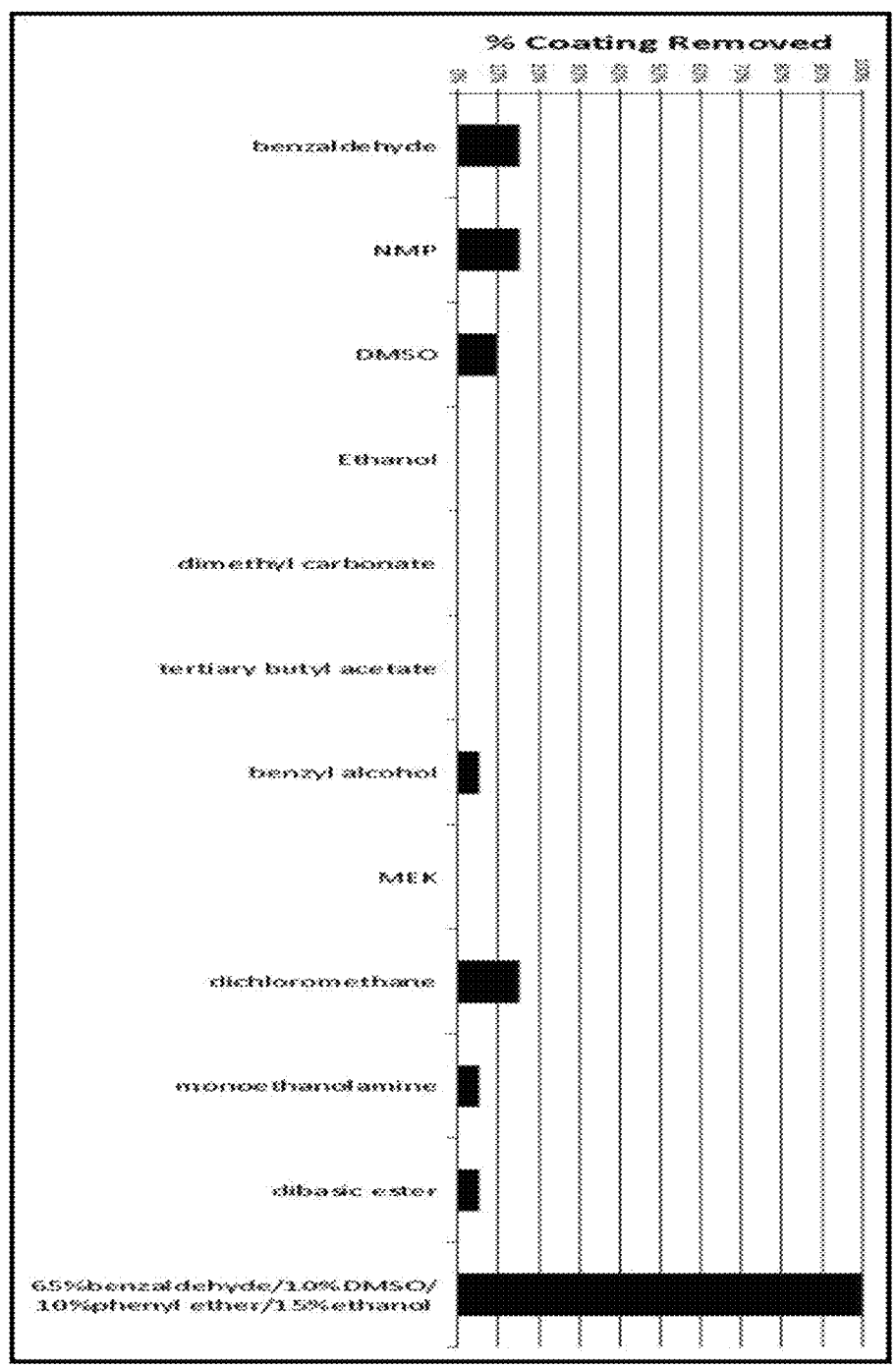
FIG. 2 is a bar chart that graphs the percentage of a typical automotive paint system removed by a number of solvents compared to the percentage removed by one embodiment of the disclosed solvent. From top to bottom: benzaldehyde, N-methyl-pyrrolidone (NMP), dimethyl sulfoxide (DMSO), ethanol, dimethyl carbonate (DMC), tertiary butyl acetate (TBAc), benzyl alcohol (BnOH), methyl ethyl ketone (MEK), dichloromethane (DCM), monoethanolamine (MEA), dibasic ester, and one embodiment of the disclosed solvent comprised of 65% benzaldehyde/10% dimethyl sulfoxide (DMSO)/10% a phenyl ether/15% ethanol.

The descriptions provided herein provide a limited number of examples of the numerous adaptations of the disclosure in which the synergistic effects of the disclosed solvent create solvency performance that far exceeds those of its components. FIG. 2 shows a comparison of the effectiveness in removing a typical automotive paint system between the primary solvent, several cosolvents, several extenders (including some RCRA hazardous solvents), and one embodiment of the disclosure. The comparison in FIG. 2 demonstrates that the embodiment of the disclosure was 100% effective in removing all layers of the typical automotive paint system while the best performance of all of the other materials was only about 15% effective removing only the Clear Coat (10) as shown in FIG. 1. This comparison demonstrates the significantly higher solvency created from the synergy of the blended components of the disclosed solvent over that of some representative examples of the solvent's possible components alone.

In other embodiments the invention provides, a solvent that comprises from about 10 to about 90 wt % carbaldehyde or a structural analog thereof and from about 10 to about 90 wt % cosolvent wherein the cosolvent comprises one or more chemicals selected from the group consisting of an alcohol, a carbonate ester, a butyl acetate, and an organosulfur compound or structural analogs thereof.

In specific embodiments, the solvent further comprises from about 1 to about 30 wt % of activator wherein the activator comprises one or more chemicals selected from the group consisting of sulfuric acid, an ethyl phenyl ether, a methyl phenyl ether, estragole, eugenol, and triethanolamine or structural analogs thereof.

In other specific embodiments, the solvent further comprises from about 10 to about 80 wt % of extender wherein the extender comprises one or more chemicals selected from the group consisting of a petroleum distillate, dibasic ester, an ether acetate, an acetate ester, an alcohol, a lactone, water, an alkylated cyclosiloxane, and a glycol alkyl ether or structural analogs thereof.

In still other embodiments, the solvent further comprises from about 5 to about 50 wt % of emulsifier wherein the emulsifier comprises one or more chemicals selected from the group consisting of an alcohol, a surfactant, and a glycol ether or structural analogs thereof.

In other embodiments, the solvent further comprises from about 1 to about 25 wt % of thickening agent wherein the thickening agent comprises one or more chemicals selected from the group consisting of a cellulosic, a silica, a wax, a polymer, and an acrylate or structural analogs thereof.

In some embodiments, the solvent further comprises from about 5 to about 25 wt % of evaporative cap wherein the evaporative cap comprises one or more chemicals selected from the group consisting of a mineral oil and a vegetable oil or structural analogs thereof.

In some embodiments, the solvent comprises from about 10 to about 30 wt % carbaldehyde or a structural analog thereof and from about 70 to about 90 wt % cosolvent wherein the cosolvent comprises one or more chemicals selected from the group consisting of an alcohol, a carbonate ester, a butyl acetate, and an organosulfur compound or structural analogs thereof.

In various embodiments, the solvent comprises from about 30 to about 50 wt % carbaldehyde and from about 50 to about 70 wt % cosolvent wherein the cosolvent comprises one or more chemicals selected from the group consisting an alcohol, a carbonate ester, a butyl acetate, and an organosulfur compound or structural analogs thereof.

In other embodiments, the solvent comprises from about 50 to about 70 wt % carbaldehyde and from about 30 to about 50 wt % cosolvent wherein the cosolvent comprises one or more chemicals selected from the group consisting of an alcohol, a carbonate ester, a butyl acetate, and an organosulfur compound or structural analogs thereof.

In some embodiments, the solvent comprises from about 70 to about 90 wt % carbaldehyde and from about 10 to about 30 wt % cosolvent wherein the cosolvent comprises one or more chemicals selected from the group consisting of an alcohol, a carbonate ester, a butyl acetate, and an organosulfur compound or structural analogs thereof.

Figure 3:
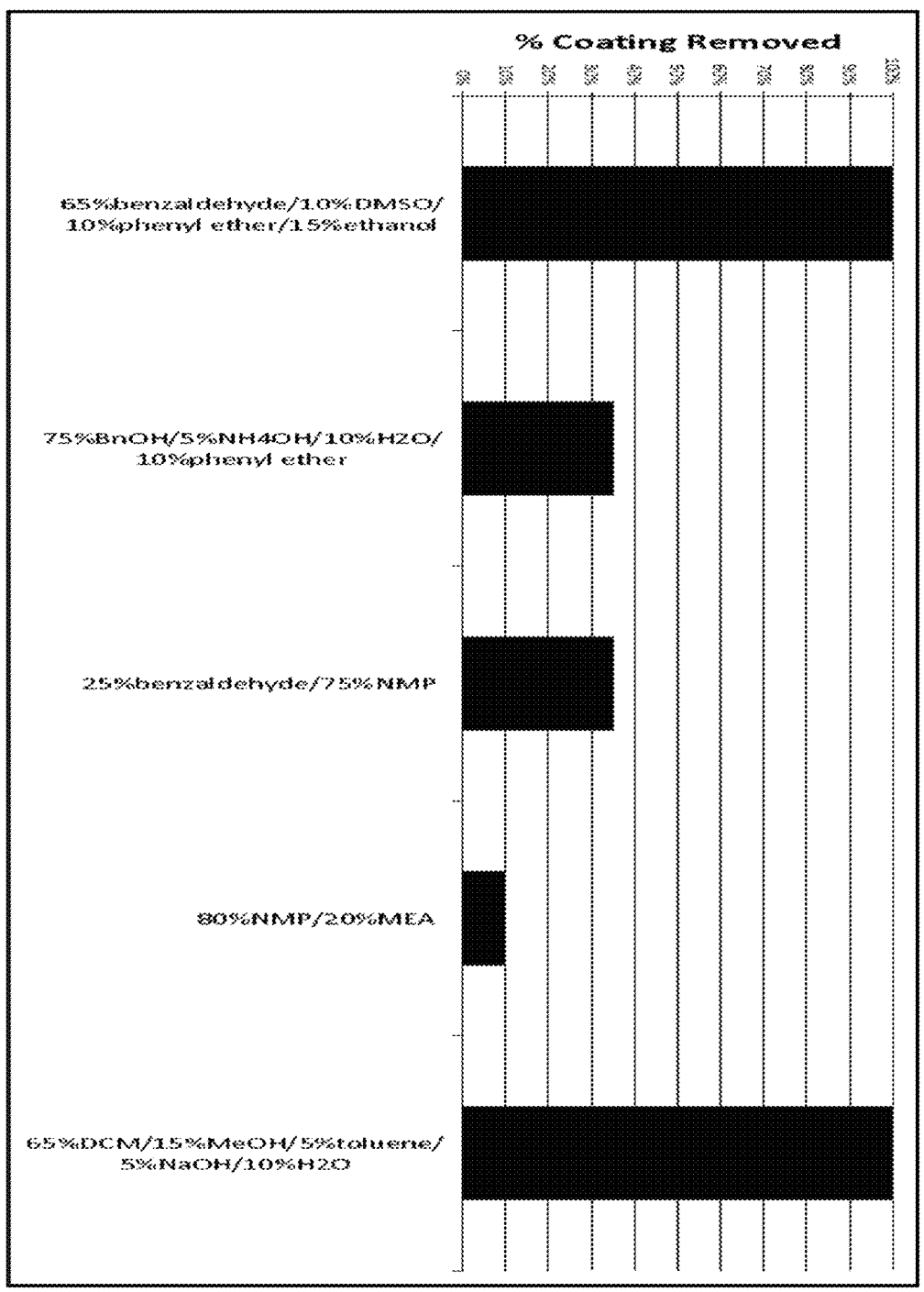
FIG. 3 is a bar chart that graphs the comparative times required to remove a typical automotive paint system for one embodiment of the disclosed solvent and several commercially available paint removers. From top to bottom: an example of the first embodiment containing 65% benzaldehyde/10% dimethyl sulfoxide (DMSO)/10% a phenyl ether/15% ethanol; a blend similar to a control formula in a military specification containing 75% benzyl alcohol (BnOH)/5% ammonium hydroxide/10% water (H2O)/10% a phenyl ether; a commercially available non-hazardous striper containing 75% N-methyl-pyrrolidone (NMP)/25% benzaldehyde; a commercially available stripper that is hazardous due to corrosivity containing 80% N-methyl-pyrrolidone (NMP)/20% monoethanolamine (MEA); and a commercially available hazardous chlorinated stripper containing 65% dichloromethane (DCM)/15% methanol (MeOH)/5% toluene/5% sodium hydroxide/10% water (H2O).

The operation of an exemplary embodiment of the invention is illustrated in FIG. 3, which shows the performance on a typical automotive paint system of, from top to bottom, an example of an embodiment containing 65% benzaldehyde/10% dimethyl sulfoxide (DMSO)/10% phenyl ether/15% ethanol; a blend similar to a military specification control formula containing 75% benzyl alcohol (BnOH)/5% ammonium hydroxide/10% water ($H_2O$)/10% methyl phenyl ether; a commercially available non-hazardous striper containing 75% N-methyl-pyrrolidone (NMP)/25% benzaldehyde; a commercially available stripper that is RCRA hazardous due to corrosivity containing 80% N-methyl-pyrrolidone (NMP)/20% monoethanolamine (MEA); and a commercially available RCRA hazardous chlorinated stripper containing 65% dichloromethane (DCM)/15% methanol (MeOH)/5% toluene/5% sodium hydroxide/10% water ($H_2O$).

Each solvent blend was contacted with the paint system for four hours and the results were determined by the degree to which the coatings were attacked. The exemplary embodiment and the blend containing dichloromethane were the only two of those tested that were 100% effective in removing all of the coatings; however, the aforementioned dangers and difficulties associated with using dichloromethane are numerous.

Both the commercially available non-hazardous stripper and the military control stripper were the next best performers with a rating in the much lower 30 to 35% effective range, removing only the clear coat and part of the color coat. The hazardous blend containing monoethanolamine performed very poorly at 10% effectiveness by removing only some of the clear coat. Again, note that though a good performer, the blend containing dichloromethane (DCM) is a toxic, RCRA hazardous material with a severe skin exposure rating. These characteristics leave users at higher risk of environmental, health, and safety exposure and to the compliance issues that accompany those risks.

Figure 4:
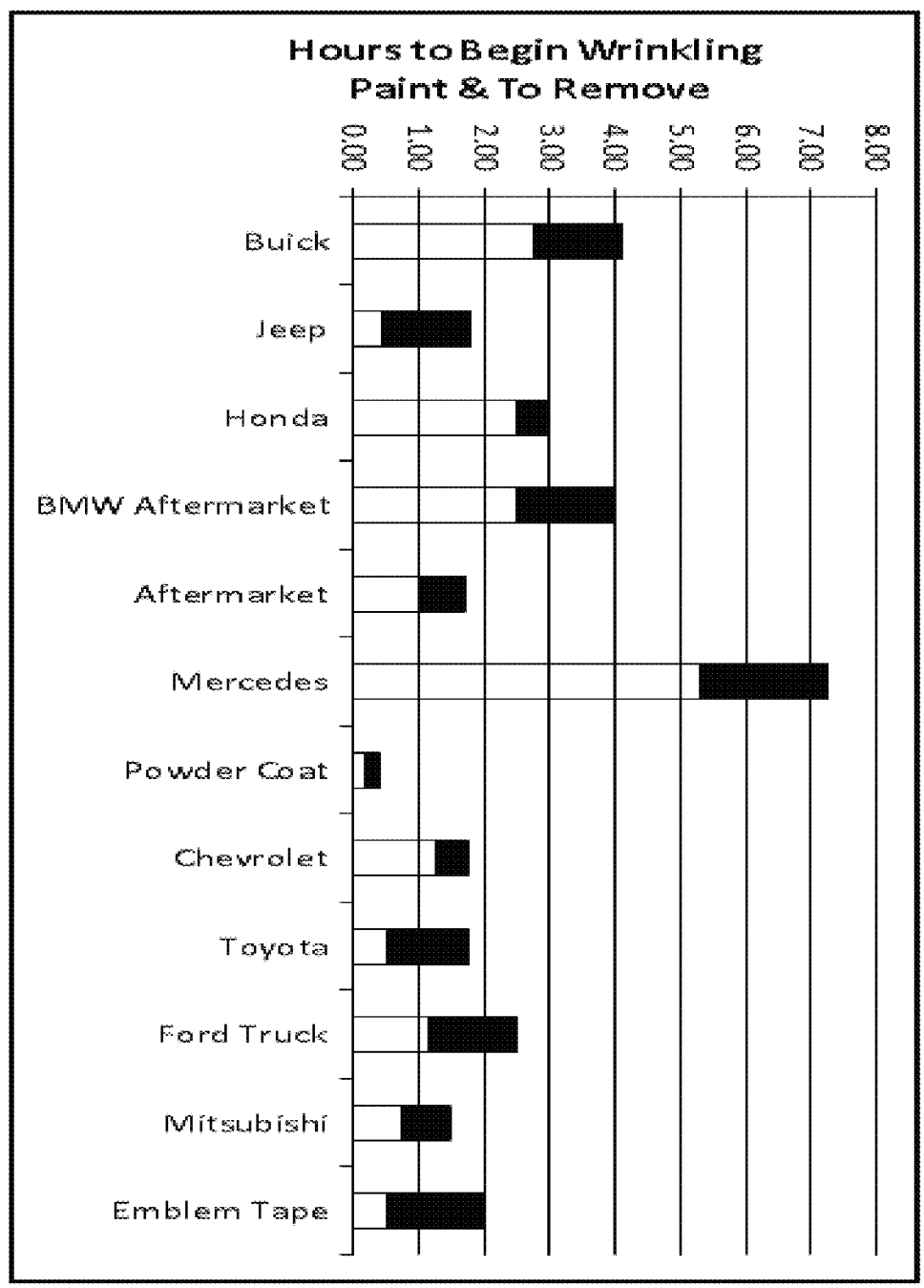
FIG. 4 is a bar chart showing the time required for one embodiment of the disclosed solvent to remove several commercially used automotive paint systems including both OEM and aftermarket paint systems as well as powder coat and emblem adhesive tape. From top to bottom: Buick, Jeep, Honda, BMW Aftermarket, Aftermarket, Mercedes, Powder Coat, Chevrolet, Toyota, Ford Truck, Mitsubishi, and Emblem Tape.

The blend containing N-methyl-pyrrolidone is a CERCLA section 313 material and requires threshold reporting under those regulations. The poorest performer containing monoethanolamine is an RCRA hazardous material due to corrosivity. FIG. 4 summarizes the time required to remove a number of automotive paint and adhesive systems from OEM and aftermarket suppliers. These systems included: Buick, Jeep, Honda, BMW Aftermarket, Aftermarket, Mercedes, Powder Coat, Chevrolet, Toyota, Ford Truck, Mitsubishi and Emblem Tape. In each instance, an exemplary embodiment of the solvent was contacted with the paint system and allowed to dwell until the paint system wrinkled or softened sufficiently to be mechanically scrapped away. In some cases, a single application was necessary to remove the entire paint or adhesive system. In some cases, more than one application of solvent was necessary to remove the entire paint or adhesive system. In all cases, 100% of the paint or adhesive system was removed with the exemplary embodiment of the disclosed solvent. Therefore, FIG. 3 and FIG. 4 show the high effectiveness of the disclosure created by the synergy of the materials of which it is comprised. This high performance from a non-RCRA hazardous solvent provides a long-sought solution to the long-felt but unsolved need to optimize the effectiveness, health, safety, and environmental compliance of cleaning and stripping solvents.

Another exemplary embodiment is a solvent that comprises from about 10 to about 90 wt % benzaldehyde or a structural analog thereof and from about 10 to about 90 wt % cosolvent wherein the cosolvent comprises one or more chemicals selected from the group consisting of ethanol, dimethyl carbonate, tertiary butyl acetate, and dimethyl sulfoxide or structural analogs thereof.

In some embodiments, the solvent further comprises from about 1 to about 30 wt % of activator wherein the activator comprises one or more chemicals selected from the group consisting of an acid, a phenyl ether, a phenyl propene, and an amine or structural analogs thereof.

In other embodiments, the solvent further comprises from about 10 to about 80 wt % of extender wherein the extender comprises one or more chemicals selected from the group consisting of a petroleum distillate, dibasic ester, an ether acetate, an acetate ester, an alcohol, a lactone, water, an alkylated cyclosiloxane, and a glycol alkyl ether or structural analogs thereof.

In still other embodiments, the solvent further comprises from about 5 to about 50 wt % of emulsifier wherein the emulsifier comprises one or more chemicals selected from the group consisting of an alcohol, a surfactant, and a glycol ether or structural analogs thereof.

In other embodiments, the solvent further comprises from about 1 to about 25 wt % of thickening agent wherein the thickening agent comprises one or more chemicals selected from the group consisting of a cellulosic, a silica, a wax, a polymer, and an acrylate or structural analogs thereof.

In some embodiments, the solvent further comprises from about 5 to about 25 wt % of evaporative cap wherein the evaporative cap comprises one or more chemicals selected from the group consisting of paraffinic oil, naphthenic oil, essential oil, aromatic oil, and vegetable oil or structural analogs thereof.

Figure 5:
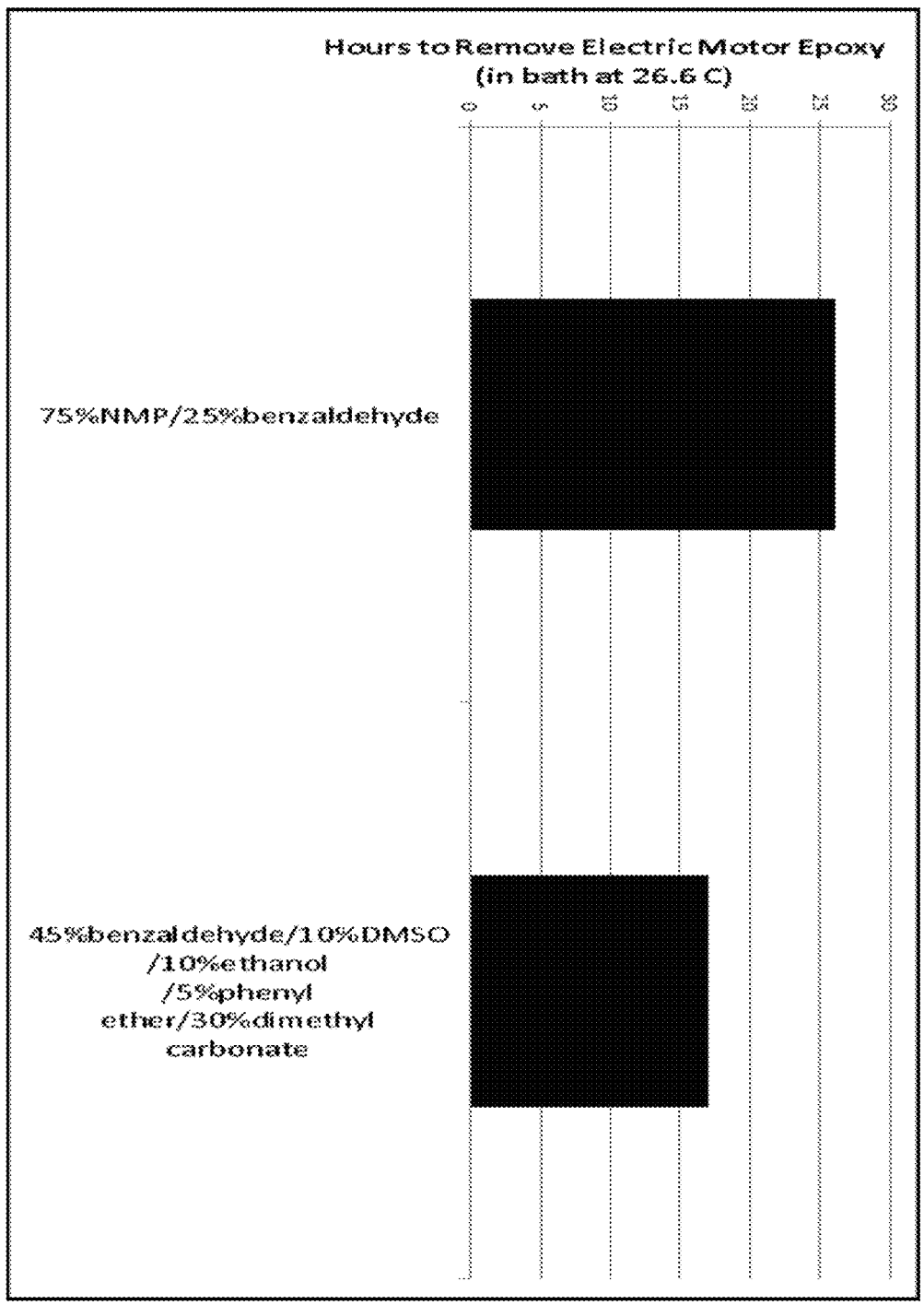
FIG. 5 is a bar chart that graphs the time required for one embodiment of the disclosed solvent to adequately soften varnish from electric motor winding at ambient temperature of 26.6° C. such that the wires can be easily separated from each other compared to that of a commercially available remover. From top to bottom: commercially available solvent comprised of 75% N-methyl-pyrrolidone (NMP)/25% benzaldehyde and an example of one embodiment of the disclosed solvent comprised of 45% benzaldehyde/10% dimethyl sulfoxide (DMSO)/10% ethanol/5% a phenyl ether/30% dimethyl carbonate (DMC).

The operation of an exemplary embodiment is demonstrated in FIG. 5, which shows the performance on a typical electric motor epoxy sealant of, from top to bottom: commercially available solvent comprised of 75% N-methyl-pyrrolidone (NMP)/25% benzaldehyde and an exemplary embodiment of the disclosed solvent comprised of 45% benzaldehyde/10% dimethyl sulfoxide (DMSO)/10% ethanol/5% phenyl ether/30% dimethyl ether (DMC).

Although both solvents were effective in dissolving the electric motor epoxy sufficiently for separating the wires, the exemplary embodiment of the disclosed solvent completed the task in about 35% less time, contains no CERCLA 313 chemicals, and is only 70% VOC content compared to the 100% VOC content of the commercially available solvent. With conventional solvents being both dangerous and mostly ineffective on modern electric motor sealants, this example embodiment of the disclosed solvent provides a long-sought solution to the long-felt but unsolved need to optimize the effectiveness, health, safety, and environmental compliance of electrical component strippers.

Figure 6:
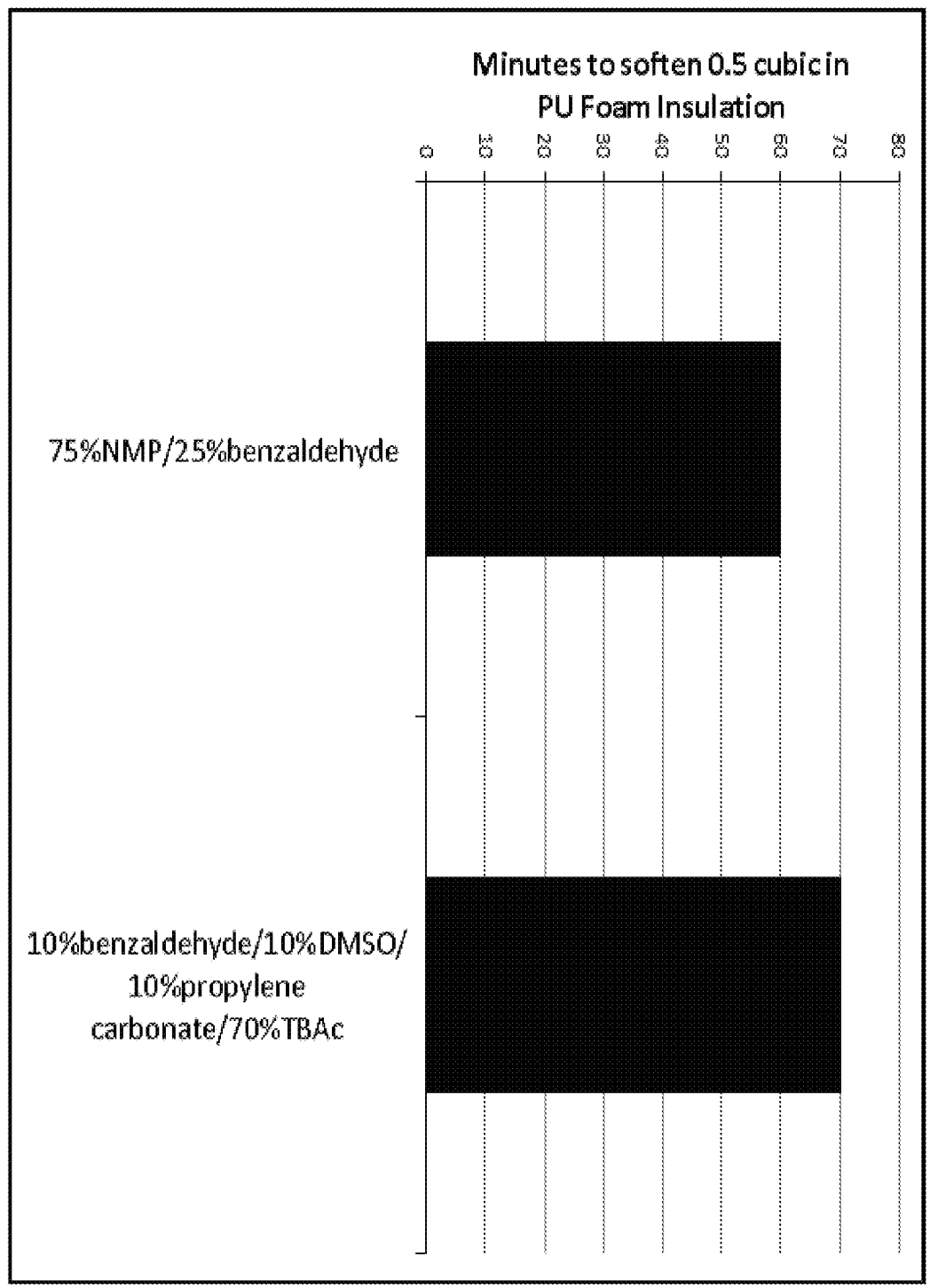
FIG. 6 is a bar chart that graphs the time required to decompose a 0.5 cubic inch piece of high density polyurethane foam insulation at ambient temperature. This chart is a comparison between the performance of the one embodiment of the disclosed solvent and a commercially available blend of N-methyl-pyrrolidone (NMP) and benzaldehyde. From top to bottom: commercially available solvent comprised of 75% N-methyl-pyrrolidone (NMP)/25% benzaldehyde and one embodiment of the disclosed solvent comprised of 10% benzaldehyde/10% dimethyl sulfoxide (DMSO)/10% propylene carbonate/70% tertiary butyl acetate (TBAc).

FIG. 6 shows the performance on a typical polyurethane foam insulation material of, an exemplary embodiment of the solvent. This embodiment being comprised of 10% benzaldehyde/10% dimethyl sulfoxide (DMSO)/10% propylene carbonate/70% tertiary butyl acetate (TBAc) and a commercially available solvent comprised of 75% N-methyl-pyrrolidone (NMP)/25% benzaldehyde. In both instances, a one half inch cube of polyurethane foam insulation was placed in a bath of the solvent at ambient temperature of 25° C. Both solvents were 100% effective at softening the polyurethane foam insulation. The commercially available solvent completed the task in about 14% less time but, the exemplary embodiment of the disclosed solvent contains no CERCLA 313 chemicals and has only 20% VOC content compared to 100% VOC content for the commercially available solvent as calculated by CARB rules. At only 20% VOC content, the example embodiment meets most state VOC standards for even general purpose solvents. These characteristics have value that more than offsets the slightly slower rate of solvency in this application.

The disclosed solvent in all of its embodiments and adaptations may be used to remove urethane, varnish, or epoxy coatings and adhesives using methods described herein. One exemplary method includes separating a coating system comprising one or more films of urethane, varnish, and epoxy alone or in combination bonded to a component at a bond interface, the urethane, varnish, and epoxy having an exposed surface, the method comprising the steps of: (a) contacting the exposed surface with a solvent comprising an aldehyde and cosolvent wherein the cosolvent comprises one or more chemicals selected from the group consisting of a polar protic solvent, a carbonate ester, and an organosulfur compound or structural analog thereof; for a period of time until the bond interface is weakened; and (b) separating the component from the coating system at the bond interface.

The operation of this method of paint and adhesive removal is demonstrated in the results shown in FIG. 2, FIG. 3, FIG. 4, FIG. 5, and FIG. 6.

In some embodiments it is preferable to improve the effectiveness of the solvent or accelerate the decomposition of the coating or adhesive by utilizing an alternative method for separating a urethane, varnish, or epoxy bonded to a component at a bond interface where the urethane, varnish, or epoxy has an exposed surface. Another exemplary method includes steps of: (a) contacting the exposed surface with a solvent comprising an aldehyde and cosolvent wherein the cosolvent comprises one or more chemicals selected from the group consisting of a polar protic solvent, a carbonate ester, and an organosulfur compound or structural analogs thereof; for a period of time until the bond interface is weakened, the solvent being heated to a temperature above ambient temperature for at least a portion of the period of time; and (b) separating the component from the coating system at the bond interface.

In some embodiments, the disclosed solvent is further comprised of from about 5 to about 25 wt % evaporative cap wherein the evaporative cap comprises one or more chemicals selected from the group consisting of a paraffinic oil, a naphthenic oil, an essential oil, an aromatic oil, and a vegetable oil.

Figure 7:
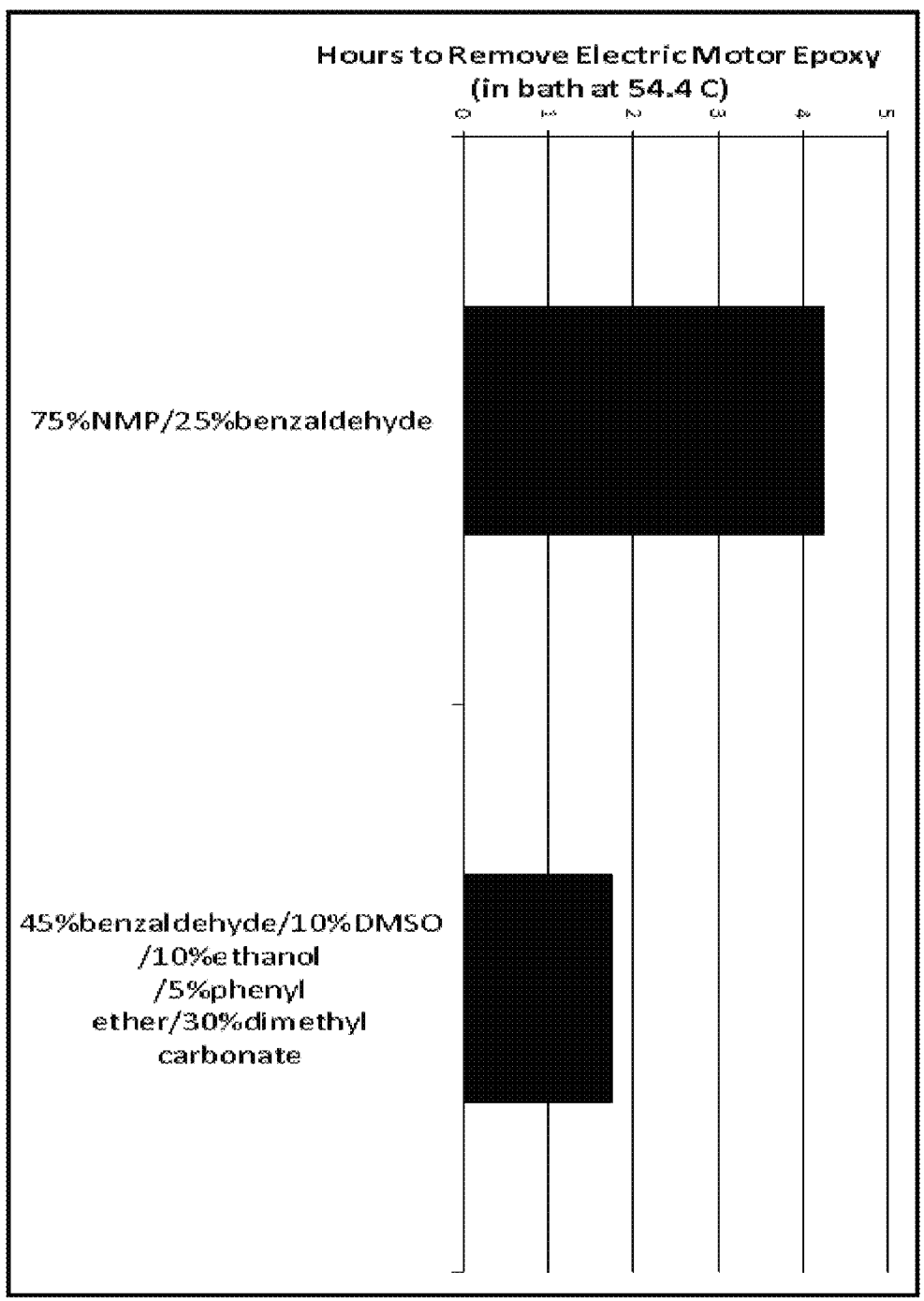
FIG. 7 is a bar chart that graphs the time required for one embodiment of the disclosed solvent to adequately soften varnish from electric motor winding at a heated temperature of 54.4° C. such that the wires can be easily separated from each other compared to that of a commercially available remover blend. From top to bottom: commercially available solvent comprised of 75% N-methyl-pyrrolidone (NMP)/25% benzaldehyde and an example of one embodiment of the disclosed solvent comprised of 45% benzaldehyde/10% dimethyl sulfoxide (DMSO)/10% ethanol/5% a phenyl ether/30% dimethyl carbonate (DMC).

The effectiveness of this exemplary method for removing paint and adhesive is demonstrated in FIG. 7 which shows the result of a commercially available solvent comprised of 75% N-methyl-pyrrolidone (NMP)/25% benzaldehyde and an exemplary embodiment of the disclosed solvent comprised of 45% benzaldehyde/10% dimethyl sulfoxide (DMSO)/10% ethanol/5% phenyl ether/30% dimethyl ether (DMC) in removing electric motor epoxy sealant sufficiently that coated wires can be separated. In this example, the solvent and the parts being stripped of epoxy sealant are heated to a temperature of 54.4° C. Comparing the results shown in FIG. 7 with those shown in FIG. 5 (in which the same solvents perform the same task at lower ambient temperature), one can easily see an 85% faster completion of the task when heated.

While the above description contains many specificities, these should not be construed as limitations on the scope, but rather as an exemplification of several preferred embodiments thereof. The skilled artisan will understand that many other variations are possible. For example other extenders, thickening agents, emulsifiers, or evaporative cap materials may be employed: such as, using a cyclosiloxane or another environmental protection agency (EPA) VOC exempt material, as an extender to increase flashpoint and decrease VOC content.

Solvent, cosolvent, extender, activator, thickener, emulsifier and evaporative cap combinations may vary from those embodiments specifically described as representations of the many adaptations possible. Similarly, the percent by weight of the various components within the solvent may vary substantially depending upon the desired characteristics and their relative importance. Accordingly, the scope should be determined not by the embodiments illustrated, but by the appended claims and their legal equivalents.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A solvent composition comprising from about 10 to about 90 wt % carbaldehyde or a structural analog thereof and from about 10 to about 90 wt % of a cosolvent wherein the cosolvent comprises one or more chemicals selected from the group consisting of a carbonate ester or structural analogs thereof.

2. The solvent composition of claim 1, further comprising about 1 to about 30 wt % of an activator wherein the activator comprises one or more chemicals selected from the group consisting of an acid, a phenyl ether, a phenyl propene, and an amine.

3. The solvent composition of claim 1, further comprising about 10 to about 80 wt % of an extender wherein the extender comprises one or more chemicals selected from the group consisting of a petroleum distillate, dibasic ester, an ether acetate, an acetate ester, an alcohol, a lactone, an alkylated cyclosiloxane, and a glycol alkyl ether or structural analogs thereof.

4. The solvent composition of claim 1, further comprising additive means for emulsifying immiscible components of the solvent.

5. The solvent composition of claim 1, further comprising additive means for increasing the viscosity of the solvent.

6. The solvent composition of claim 1, further comprising additive means for reducing the rate of evaporation of the solvent.

7. A solvent composition comprising from about 10 to about 90 wt % carbaldehyde or a structural analog thereof and from about 10 to about 90 wt % of a cosolvent wherein the cosolvent comprises one or more chemicals selected from the group consisting of a butyl acetate or structural analogs thereof.

8. The solvent composition of claim 7, further comprising about 1 to about 30 wt % of an activator wherein the activator comprises one or more chemicals selected from the group consisting of an acid, a phenyl ether, a phenyl propene, and an amine.

9. The solvent composition of claim 7, further comprising about 10 to about 80 wt % of an extender wherein the extender comprises one or more chemicals selected from the group consisting of a petroleum distillate, dibasic ester, an ether acetate, an acetate ester, an alcohol, a lactone, an alkylated cyclosiloxane, and a glycol alkyl ether or structural analogs thereof.

10. The solvent composition of claim 7, further comprising additive means for emulsifying immiscible components of the solvent.

11. The solvent composition of claim 7, further comprising additive means for increasing the viscosity of the solvent.

12. The solvent composition of claim 7, further comprising additive means for reducing the rate of evaporation of the solvent.

13. A solvent composition comprising from about 10 to about 90 wt % carbaldehyde or a structural analog thereof and from about 10 to about 90 wt % of a cosolvent wherein the cosolvent comprises dimethyl carbonate or structural analogs thereof.

14. A solvent composition comprising from about 10 to about 90 wt % carbaldehyde or a structural analog thereof and from about 10 to about 90 wt % of a cosolvent wherein the cosolvent comprises tertiary butyl acetate or structural analogs thereof.

15. A non-aqueous solvent composition comprising from about 10 to about 90 wt % carbaldehyde or a structural analog thereof and from about 10 to about 90 wt % of a cosolvent wherein the cosolvent comprises one or more chemicals selected from the group consisting of an alcohol, a carbonate ester, a butyl acetate, and an organosulfur compound or structural analogs thereof, further comprising from about 1 to about 25 wt % of a thickening agent wherein the thickening agent comprises one or more chemicals selected from the group consisting of a cellulosic, a silica, a wax, a polymer, and an acrylate or structural analogs thereof.

16. The non-aqueous solvent of claim 15 wherein the cosolvent comprises one or more chemicals selected from the group consisting of ethanol, dimethyl carbonate, tertiary butyl acetate, and dimethyl sulfoxide or structural analogs thereof.

17. A non-aqueous solvent composition comprising from about 10 to about 90 wt % carbaldehyde or a structural analog thereof and from about 10 to about 90 wt % of a cosolvent wherein the cosolvent comprises one or more chemicals selected from the group consisting of an alcohol, a carbonate ester, a butyl acetate, and an organosulfur compound or structural analogs thereof, further comprising from about 10 to about 30 wt % carbaldehyde or a structural analog thereof and from about 70 to about 90 wt % of a cosolvent wherein the cosolvent comprises one or more chemicals selected from the group consisting of an alcohol, a carbonate ester, a butyl acetate, and an organosulfur compound or structural analogs thereof.

18. The solvent of claim 17 wherein the cosolvent further comprises one or more chemicals selected from the group consisting of ethanol, dimethyl carbonate, tertiary butyl acetate, and dimethyl sulfoxide or structural analogs thereof.

19. A non-aqueous solvent composition comprising from about 10 to about 90 wt % aldehyde or a structural analog thereof and from about 10 to about 90 wt % of cosolvent wherein the cosolvent comprises one or more chemicals selected from the group consisting of a non-cyclic amide polar aprotic solvent, an ester, an acetate, and a sulfur compound or structural analogs thereof.

20. The non-aqueous solvent composition of claim 19, further comprising about 1 to about 30 wt % of an activator wherein the activator comprises one or more chemicals selected from the group consisting of an acid, a phenyl ether, a phenyl propene, and an amine.

21. The non-aqueous solvent composition of claim 19, further comprising about 10 to about 80 wt % of an extender wherein the extender comprises one or more chemicals selected from the group consisting of a petroleum distillate, dibasic ester, an ether acetate, an acetate ester, an alcohol, a lactone, an alkylated cyclosiloxane, and a glycol alkyl ether or structural analogs thereof.

22. The non-aqueous solvent composition of claim 19, further comprising additive means for emulsifying immiscible components of the solvent.

23. The non-aqueous solvent composition of claim 19, further comprising additive means for increasing the viscosity of the solvent.

24. The non-aqueous solvent composition of claim 19, further comprising additive means for reducing the rate of evaporation of the solvent.

25. A non-aqueous solvent composition comprising from about 10 to about 90 wt % aldehyde or a structural analog thereof and from about 10 to about 90 wt % of cosolvent wherein the cosolvent comprises one or more chemicals selected from the group consisting of a non-cyclic amide polar aprotic solvent, an ester, and an acetate or structural analogs thereof.

26. The non-aqueous solvent of claim 25, wherein the cosolvent comprises one or more chemicals selected from the group consisting of a dimethyl acetamide, dimethyl carbonate, and tertiary butyl acetate.

27. The non-aqueous solvent composition of claim 25, further comprising about 1 to about 30 wt % of an activator wherein the activator comprises one or more chemicals selected from the group consisting of an acid, a phenyl ether, a phenyl propene, and an amine.

28. The non-aqueous solvent composition of claim 25, further comprising about 10 to about 80 wt % of an extender wherein the extender comprises one or more chemicals selected from the group consisting of a petroleum distillate, dibasic ester, an ether acetate, an acetate ester, an alcohol, a lactone, an alkylated cyclosiloxane, and a glycol alkyl ether or structural analogs thereof.

29. The non-aqueous solvent composition of claim 25, further comprising additive means for emulsifying immiscible components of the solvent.

30. The non-aqueous solvent composition of claim 25, further comprising additive means for increasing the viscosity of the solvent.

31. The non-aqueous solvent composition of claim 25, further comprising additive means for reducing the rate of evaporation of the solvent.

32. The non-aqueous solvent composition of claim 25, further comprising about 10 to about 80 wt % of an extender wherein the extender comprises one or more chemicals selected from the group consisting of solvents having a boiling point above 216 degrees Celsius or a vapor pressure below 0.1 mm Hg at 20 degrees Celsius.

33. A non-aqueous solvent composition comprising from about 10 to about 90 wt % carbaldehyde or a structural analog thereof and from about 10 to about 90 wt % of a cosolvent wherein the cosolvent comprises one or more chemicals selected from the group consisting of a non-cyclic amide, a carbonate, an acetate, and a sulfur oxide or structural analogs thereof.

34. The non-aqueous solvent of claim 32, wherein the cosolvent comprises one or more chemicals selected from the group consisting of dimethyl acetamide, dimethyl carbonate, tertiary butyl acetate, and DMSO or structural analogs thereof.

* * * * *